(12) United States Patent
Conrady et al.

(10) Patent No.: US 12,181,014 B2
(45) Date of Patent: Dec. 31, 2024

(54) STATIONARY VIBRATION ISOLATION SYSTEM AND CONTROL METHOD THEREOF

(71) Applicant: Integrated Dynamics Engineering GmbH, Raunheim (DE)

(72) Inventors: Carsten Conrady, Riedstadt (DE); Han Hartgers, Mainz (DE); Björn Dollak, Hochheim (DE)

(73) Assignee: Integrated Dynamics Engineering GmbH, Raunheim (DE)

( * ) Notice: Subject to any disclaimer, the term of this patent is extended or adjusted under 35 U.S.C. 154(b) by 316 days.

(21) Appl. No.: 16/846,619

(22) Filed: Apr. 13, 2020

(65) Prior Publication Data

US 2020/0325958 A1 Oct. 15, 2020

(30) Foreign Application Priority Data

Apr. 15, 2019 (EP) .................................... 19169238

(51) Int. Cl.
*F16F 15/00* (2006.01)
*F16F 9/50* (2006.01)
*F16F 15/023* (2006.01)
*G05B 19/404* (2006.01)
*G06F 13/42* (2006.01)

(52) U.S. Cl.
CPC .............. *F16F 15/002* (2013.01); *F16F 9/50* (2013.01); *F16F 15/0232* (2013.01); *G05B 19/404* (2013.01); *G06F 13/42* (2013.01); *F16F 2228/066* (2013.01); *F16F 2230/18* (2013.01); *G05B 2219/39199* (2013.01); *G06F 2213/3808* (2013.01)

(58) Field of Classification Search
CPC ........ F16F 15/002; F16F 15/0232; F16F 9/50; F16F 2228/066; F16F 2230/18; G06F 13/42; G06F 2213/3808; G05B 19/404; G05B 2219/39199
See application file for complete search history.

(56) References Cited

U.S. PATENT DOCUMENTS

| | | | |
|---|---|---|---|
| 4,634,142 A * | 1/1987 | Woods ............... | B60G 17/0155 280/5.513 |
| 5,812,958 A | 9/1998 | Mayama | |

(Continued)

FOREIGN PATENT DOCUMENTS

| | | | | |
|---|---|---|---|---|
| CN | 1965174 A | * | 5/2007 | ......... B60G 17/0152 |
| CN | 201340553 Y | | 11/2009 | |

(Continued)

OTHER PUBLICATIONS

Extended European Search Report dated Oct. 29, 2019 for European Application No. 19 16 9238 (8 pages).

(Continued)

*Primary Examiner* — Vishal R Sahni
(74) *Attorney, Agent, or Firm* — Taylor IP, P.C.

(57) ABSTRACT

A stationary vibration isolation system including a plurality of isolators by way of which a load which is mounted in a vibration isolated manner is supported. The vibration isolation system includes a plurality of actuators by way of which vibrations of the load are actively countered. Each isolator respectively has its own separate control unit with a digital-analog converter for controlling the actuators.

13 Claims, 7 Drawing Sheets

(56) References Cited

U.S. PATENT DOCUMENTS

| | | | |
|---|---|---|---|
| 6,286,644 B1 | 9/2001 | Wakui | |
| 6,502,837 B1 * | 1/2003 | Hamilton | B60G 17/0152 280/5.515 |
| 6,538,719 B1 * | 3/2003 | Takahashi | G03F 7/70833 355/75 |
| 8,002,233 B2 * | 8/2011 | McMickell | F16F 15/02 267/136 |
| 8,210,330 B2 * | 7/2012 | Vandewal | B60G 17/0152 188/282.1 |
| 2003/0057346 A1 | 3/2003 | Wakui | |
| 2007/0272820 A1 | 11/2007 | Heiland | |
| 2009/0078847 A1 * | 3/2009 | McMickell | F16F 15/02 248/550 |
| 2016/0097436 A1 * | 4/2016 | Goold | F16F 15/007 267/140.14 |

FOREIGN PATENT DOCUMENTS

| | | | | |
|---|---|---|---|---|
| CN | 102705431 A | | 10/2012 | |
| CN | 107061591 A | | 8/2017 | |
| EP | 2 295 829 A1 | | 3/2011 | |
| KR | 20160106955 A | * | 9/2016 | F16F 9/535 |

OTHER PUBLICATIONS

Chinese Office Action dated May 27, 2023 for Chinese Patent Application No. 202010284756.9 (9 pages).

"Heating and Air Conditioning System Operation Management, Energy Savings and Diagnostic Technology Guide", CIP Data Verification, China Electric Power Press, No. 065772, 2003 (6 pages).

English machine translation "Heating and Air Conditioning System Operation Management, Energy Savings and Diagnostic Technology Guide", CIP Data Verification, China Electric Power Press, No. 065772, 2003 (4 pages).

"Fundamentals of Computer Applications" 21st Century Colleges and Universities Computer Application Technology Series Planning Textbook 7, Tan Haoqiang, Computer Application Fundamentals (Second Edition) China Railway Press, No. 100054, Aug. 2006 (7 pages).

English machine translation "Fundamentals of Computer Applications" 21st Century Colleges and Universities Computer Application Technology Series Planning Textbook 7, Tan Haoqiang, Computer Application Fundamentals (Second Edition) China Railway Press, No. 100054, Aug. 2006 (4 pages).

Chinese Office Action dated May 16, 2024 for Chinese Patent Application 202010284756.9 (11 pages).

English translation of Chinese Office Action dated May 16, 2024 for Chinese Patent Application 202010284756.9 (14 pages).

"Remote monitoring technology for solar wind power plants", Sun Bing et al., "Twelfth Five-Year Plan" for Energy Specialties in Higher Vocational Education, National Model Higher Vocational Colleges and Universities High-quality Teaching Materials, Aug. 2013 (6 pages).

English machine translation of "Remote monitoring technology for solar wind power plants", Sun Bing et al., "Twelfth Five-Year Plan" for Energy Specialties in Higher Vocational Education, National Model Higher Vocational Colleges and Universities High-quality Teaching Materials, Aug. 2013 (12 pages).

* cited by examiner

STATIONARY VIBRATION ISOLATION SYSTEM AND CONTROL METHOD THEREOF

BACKGROUND OF THE INVENTION

1. Field of the Invention

The present invention relates to a stationary vibration isolation system and to a method of controlling the same and an isolator for a stationary vibration isolation system.

The invention relates in particular to a stationary vibration isolation system on which a machine is arranged for processing of semiconductor components and/or of nanostructured elements, in particular wafers, masks or display substrates, or for measuring of semiconductor components and/or nanostructured elements, for example an electron beam microscope.

Furthermore, laboratory equipment and/or medical devises, for example imaging devices such as MRI scanners can also be arranged on the stationary vibration isolation system.

2. Description of the Related Art

Stationary vibration isolation systems can be used in the semiconductor industry for mounting of processing machinery, for example lithography devices and measuring devices, for example electron beam microscopes, in order to mount sensitive equipment for processing of semiconductor components in a vibration isolated manner.

Normally, such a vibration isolation system consists of a pad which is mounted in a vibration isolated manner on at least three isolators which in each case include a spring.

The devices for processing of semiconductor components are arranged on the pad and are thus protected from vibrations. The pad and the devices mounted on the pad, together form the vibration isolated load.

Particularly active vibration isolation systems are known from practice, in which the isolators include actuators, especially solenoid actuators in addition to the spring with which vibrations are actively countered.

Vibrations are captured via sensors which can be arranged on the base of the isolator or also on the vibration isolated load. The actuators are controlled on the basis of the sensor signals in order to thus compensate vibrations by generating counter forces.

By way of such active control, prolonged external vibrations affecting the system, as well as vibrations which are produced by the load itself which is mounted in a vibration isolated manner (for example by a movable stage or a moving robot) can be countered.

Patent document EP 2 295 829 B1 (Integrated Dynamics Engineering) illustrates a vibration isolation system wherein actuators for the generation of compensating forces are present in several degrees of freedom.

For processing of the sensor signals such vibration isolation systems include a control unit (often also referred to as a controller) which captures the sensor signals and produces control signals on the basis of the sensor signals by way of which the actuators are controlled in order to thus generate compensating forces.

The controller herein is designed as a central processing unit to which the sensors as well as the actuators of all isolators of the vibration isolation system are connected.

On the one hand, this results in high wiring costs. As a rule, lines have to be installed in particular from the control unit to the sensors via which sufficiently high currents run, since the actuators which produce the counter forces can be controlled via the same.

Moreover, the maximum number of isolators which can be connected is contingent upon the design of the control unit.

Each control unit has provision for the connection of a maximum number of isolators, the result of which is that a vibration isolation system cannot be infinitely expanded with vibration isolators without replacing the control unit.

What is needed in the art is a vibration isolation system wherein the wiring costs are reduced and/or which can be flexibly sized in regard to the number of isolators.

SUMMARY OF THE INVENTION

The present invention provides a stationary vibration isolation system, an isolator for a stationary vibration isolation system, and a method of controlling an active stationary vibration isolation system.

The stationary vibration isolation system includes in particular a machine for processing of semiconductor components and/or of nanostructured elements which is mounted in a vibration isolated manner. This can for example be a lithography device, an optical waver inspection device, a measuring device, for example an electron beam microscope, etc. Moreover, laboratory equipment, medical devices, in particular an imaging medical device, for example an MRI scanner can also be mounted on the vibration isolation system in a vibration isolated manner.

The vibration isolation system includes a plurality of isolators by way of which a load which is mounted in a vibration isolated manner is supported.

The vibration isolation system includes in particular at least three isolators on which a pad is mounted in a vibration isolated manner which together with the thereupon arranged equipment represents the vibration-isolated load.

The isolators are effective preferably in vertical as well as also in horizontal direction. The isolators may include a spring in particular a pneumatic spring. Sensors, spring and actuators can be integrated components of such an isolator or can be designed as separate units. In the latter case the separate units, in particular the spatially adjacent units of sensors, spring and actuators together, form a logical unit that assumes the function of an active vibration isolator which is not only effective as a passive spring but actively counters vibrations.

The inventive vibration isolation system includes a plurality of actuators by way of which vibrations are actively countered through generation of forces engaging on the load which is mounted in a vibration isolated manner.

The actuators can be designed specifically as solenoid actuators and/or as pneumatic actuators.

According to the invention the isolators each include a separate control unit with a digital analog-converter for control of the actuators of the respective isolator.

According to the invention, each isolator therefore includes a separate control unit with a processor on which a program runs in order to calculate control signals for generation of active counter forces via the actuators, based on sensor signals.

The calculated control signal is converted via a digital-analog converter for example into a current, in order to control a solenoid actuator.

Wiring costs can hereby be considerably reduced.

In a first embodiment of the invention the control units of the isolators are connected with a central control unit via which the control signals are transferred to the control units of the isolators.

Control signals are signals which serve to control the actuators on the basis of sensor signals and the generation of counter forces.

In addition to the decentralized control units which are arranged in the isolators this first embodiment of the invention therefore provides a control unit connected with same, which independently calculates control signals and transmits them to the control units in the isolators.

This embodiment of the invention provides the advantage that the sensor signals of all isolators can be processed in the central control unit in order to generate control signals therefrom.

Due to the fact that the central control unit only transmits control signals to the isolators, preferably in a digital form, the wiring costs are reduced. Notably, it is sufficient that the central control unit is connected with the control units of the isolators via a bus.

In a second embodiment of the invention the stationary vibration isolation system is designed such that the control units of the isolators activate the actuators independently of a central control unit.

In this embodiment of the invention a central control unit can be completely dispensed with.

In this embodiment of the invention the individual isolators are preferably connected with one another, in particular via a bus system. This allows the respective control unit of the isolator to consider the sensor signals of the other isolators.

Thus, the individual decentralized control units of the isolators can generate control signals in a coordinated manner with which the actuators are controlled.

In one embodiment of the invention the control units of the isolators can be connected via a bus system also with a central configuration and/or diagnostic unit instead of or in addition to a central control unit.

The connected configuration and/or diagnostic unit is not involved in the calculation of control signals but is designed to monitor the function of the individual control units in order to—for example—generate an error message in case of a failure. Moreover, data can also be transmitted to the individual decentralized control units via the configuration and diagnostic unit, in order to thus adapt for example the calculation routines of the decentralized control unit to the respective configuration of the vibration isolation system.

The control units of the isolators are preferably series-connected to the bus system. Thus, it is only necessary to route one bus line from one isolator to the other isolator.

In one embodiment of the present invention the bus system is designed as a real time ethernet capable bus system.

The use of a real time ethernet capable bus system allows in a simple manner that the decentralized control units can also consider the sensor signals of the other isolators.

A bus system according to standard IEC 61158-1:2014 (EtherCAT) can for example be used as a real time ethernet capable bus system.

The control units of the isolators themselves may each include an analog-digital converter by way of which a sensor signal is processed.

Sensors, actuators and control units are therefore part of the isolator itself.

It is in particular provided that the respective isolator includes at least one spring as well as a plurality of sensors and actuators, as well as a control unit for control of the same.

The isolator thus has to be connected only with a power supply and preferably also with a bus system.

Since the isolators are mechanically connected with the load that is mounted in a vibration isolated manner, they can be used directly and without additional wiring.

Compensating forces are generated in the isolator via the actuators in at least two, especially preferably at least three degrees of freedom.

The invention relates in particular to a vibration isolation system wherein actuators are located in each case in the isolators and via the actuators compensating forces are generated in three translational degrees of freedom and/or in three rotational degrees of freedom.

The vibration isolation system according to the invention is preferably designed in such a way that the number of isolators is not limited by a central control unit.

The invention allows in particular connection of more than four, especially preferably of more than six isolators.

In an advancement of the invention the isolators include a pneumatic spring, wherein the pneumatic spring is actively controlled via the control unit of the isolator.

In this embodiment of the invention, the pneumatic spring is thus actively integrated into the control loop for vibration isolation. For this, the pneumatic spring includes a valve which is controlled via the control unit of the isolator in order to control the pressure in the pneumatic spring. Active control of the pneumatic spring can serve the height adjustment as well as the active reduction of prolonging vibrations or of vibrations originating from the load that is mounted in a vibration isolating manner.

The invention also relates to an isolator that is designed for the previously described vibration isolation system. The isolator can in particular include all characteristics that were previously described in connection with the isolator.

The isolator includes in particular a spring, a plurality of actuators and a plurality of sensors.

The isolator furthermore includes a control unit. The control unit includes a processing unit which runs a program and by way of which control signals are produced under consideration of the sensor signals, in order to generate compensating forces. As previously described, the components of an isolator can also be spatially separated, distributed over the vibration isolation system.

The isolator moreover preferably includes a power connection and a connection for a bus system.

As already previously described, the control unit can communicate via the connection to the bus system with the control units of the other isolators and/or can be connected with a central control unit and/or with a configuration or diagnostic unit.

The invention also relates to a method for controlling an active stationary vibration isolation system, in particular a vibration isolation system as previously described.

Herein a load which is mounted in a vibration isolated manner is supported by a plurality of isolators and vibrations are actively countered via a plurality of actuators.

According to the invention the actuators are controlled by a respective separate control unit of each isolator.

Thus, active vibration isolation is provided independently of external control signals, preferably based on the sensor signals.

As provided in one embodiment of the invention, the respective control units may however consider the sensor signals of the other isolators, in particular if these are connected by way of a bus system.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
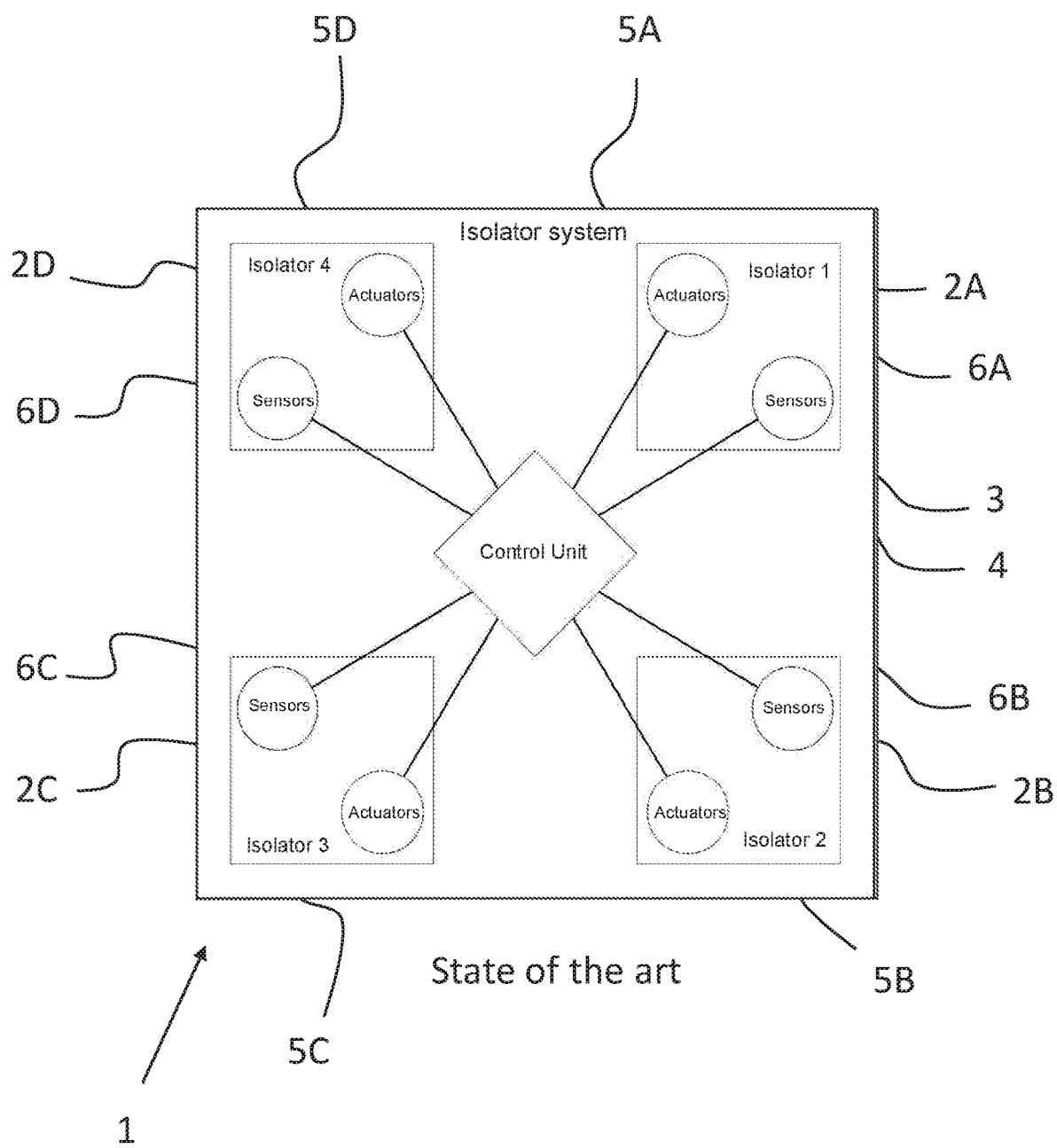
FIG. 1 shows a schematic view of the basic construction of a stationary vibration isolation system known from the current state of the art.

FIG. 1 shows a schematic view of the basic construction of a vibration isolation system 1 known from the current state of the art.

Vibration isolation system 1 includes a plurality of isolators 2A, 2B, 2C, 2D which comprise a spring and support a load 4 which is mounted in a vibration isolated manner.

Load 4 which is mounted in a vibration isolated manner can include for example a pad on which a machine for processing of semiconductor components (not illustrated) is mounted in a vibration isolated manner.

Each one of isolators 2A, 2B, 2C, 2D includes actuators 5A, 5B, 4C, 5D and sensors 6A, 6B, 6C, 6D. Sensors 6A, 6B, 6C, 6D capture vibrations of load 4 which is mounted in a vibration isolated manner and/or of the base of the isolator which is coupled with the floor.

The sensors are connected with central control unit 3. On the basis of the signals from sensors 6A, 6B, 6C, 6D, control unit 3 calculates compensation signals for control of actuators 5A, 5B, 5C, 5D.

This results in a star shaped connection of sensor 6A, 6B, 6C, 6D and actuators 5A, 5B, 5C, 5D with control unit 3.

This involves expensive wiring, in particular because sensors 6A, 6B, 6C, 6D 6A, 6B, 6C, 6D generally deliver an analog signal and because actuators 5A, 5B, 5C, 5D are controlled with an analog signal.

Thus, the control unit is not only connected via data transmission lines with isolators 2A, 2B, 2C, 2D, but lines have to be provided via which partially higher currents are transmitted for control of actuators 5A, 5B, 5C, 5D.

Figure 2:
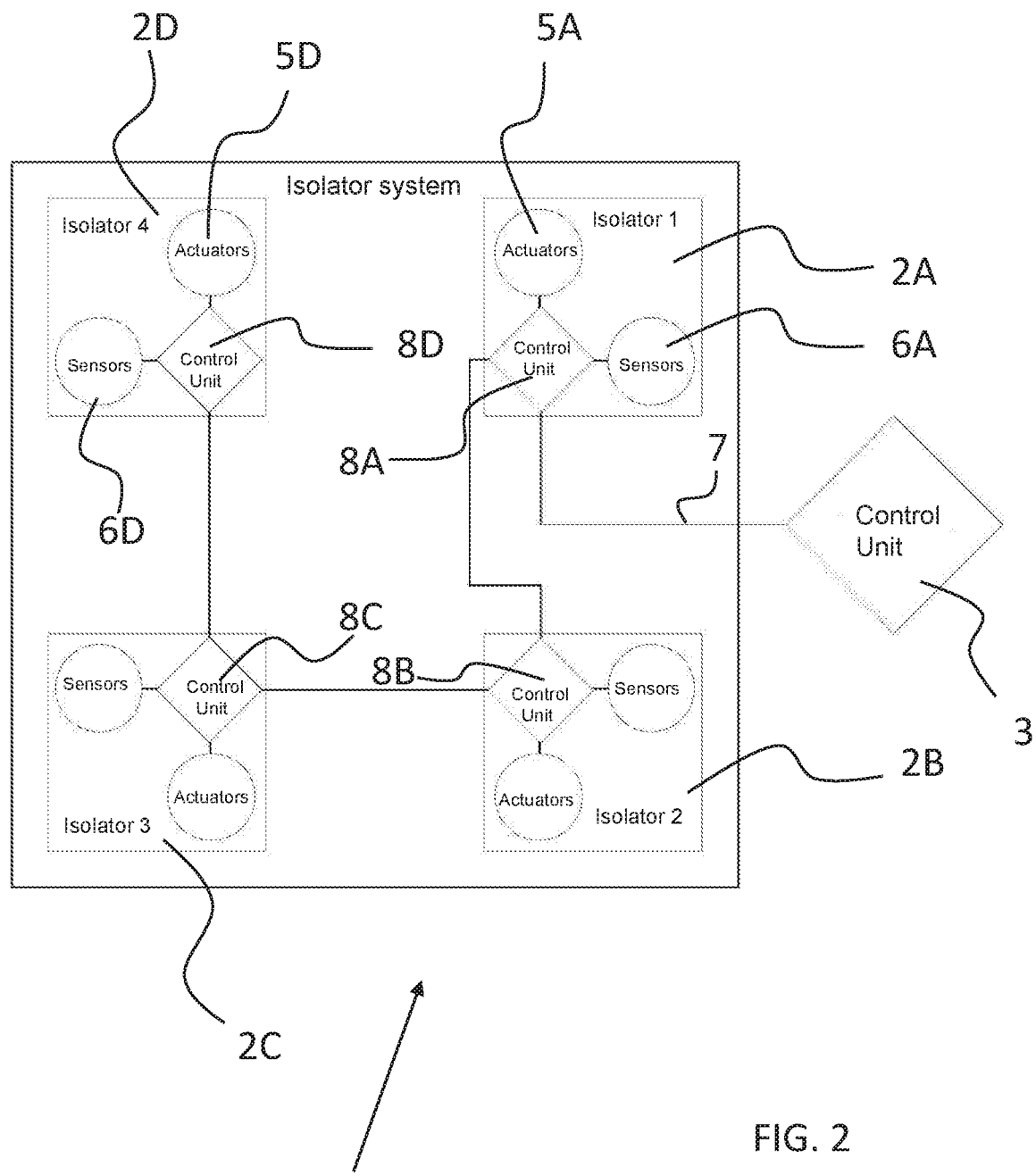
FIG. 2 shows a first embodiment of the invention, wherein the control units of the isolators are connected with a central control unit.

In a first embodiment, FIG. 2 shows a vibration isolation system 1 according to the invention. According to the invention, each isolator 2A, 2B, 2C, 2D includes its own control unit 8A, 8B, 8C, 8D.

Data of sensors 6A, 6B, 6C, 6D is collected via control units 8A, 8B, 8C, 8D, digitized and at least pre-processed.

In this embodiment, isolators 2A, 2B, 2C, 2D are connected via a bus system 7 with a central control unit 3.

Central control unit 3 collects the data from isolators 2A, 2B, 2C, 2D and on the basis of the control parameters which were calculated by decentralized control units 8A, 8B, 8C, 8D via sensors 6A, 6B, 6C, 6D and actuators 5A, 5B, 5C, 5D, calculates set values for actuators 5A, 5B, 5C, 5D.

These set values are transmitted via bus system 7 to control units 8A, 8B, 8C, 8D of the individual isolators 2A, 2B, 2C, 2D.

By use of bus system 7, wiring costs are reduced. Only a bus cable and a voltage supply are necessary for each isolator 2A, 2B, 2C, 2D.

In this embodiment the control parameters are set in central control unit 3. The sensor data is transmitted by isolators 2A, 2B, 2C, 2D to central control unit 3. The data is evaluated and the set values for actuators 5A, 5B, 5C, 5D are calculated in central control unit 3.

Since each isolator 2A, 2B, 2C, 2D has its own control unit 8A, 8B, 8C, 8D it is possible to outsource calculating operations from central control unit 3 and/or to send the sensor data, prefiltered to central control unit 3.

Figure 3:
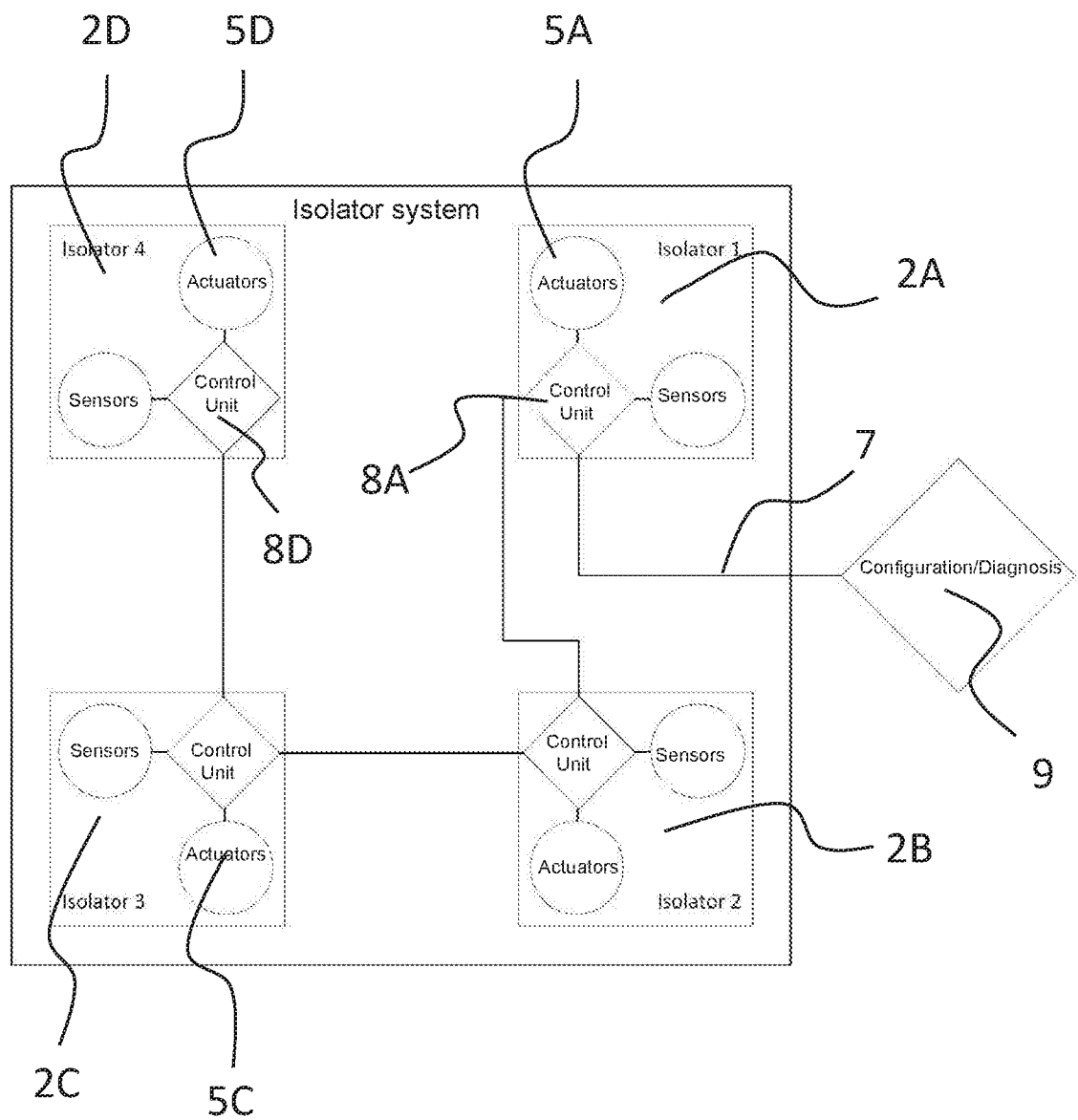
FIG. 3 shows another embodiment, wherein the isolators are connected only with a configuration and/or diagnostic unit.

FIG. 3 shows an alternative embodiment of the invention. According to the embodiment illustrated in FIG. 3 the data of the sensors is processed directly in control units 8A, 8B, 8C, 8D of isolators 2A, 2B, 2C, 2D.

Each isolator 2A, 2B, 2C, 2D has its own control parameters on the basis of which actuators 5A, 5B, 5C, 5D are controlled. A central control unit as discussed in the embodiment according to FIG. 2 is thus not required.

In this embodiment, isolators 2A, 2B, 2C, 2D or respectively control units 8A, 8B, 8C, 8D of isolators 2A, 2B, 2C, 2D are connected via a bus system 7 with a configuration and/or diagnostic unit 9.

Via configuration and/or diagnostic unit 9, data can be exchanged with control units 8A, 8B, 8C, 8D. However, configuration and/or diagnostic unit 9 does not calculate any control values for control of actuators 5A, 5B, 5C, 5D on the basis of the sensor signals but serves only to upload data for configuration and/or error control.

Figure 4:
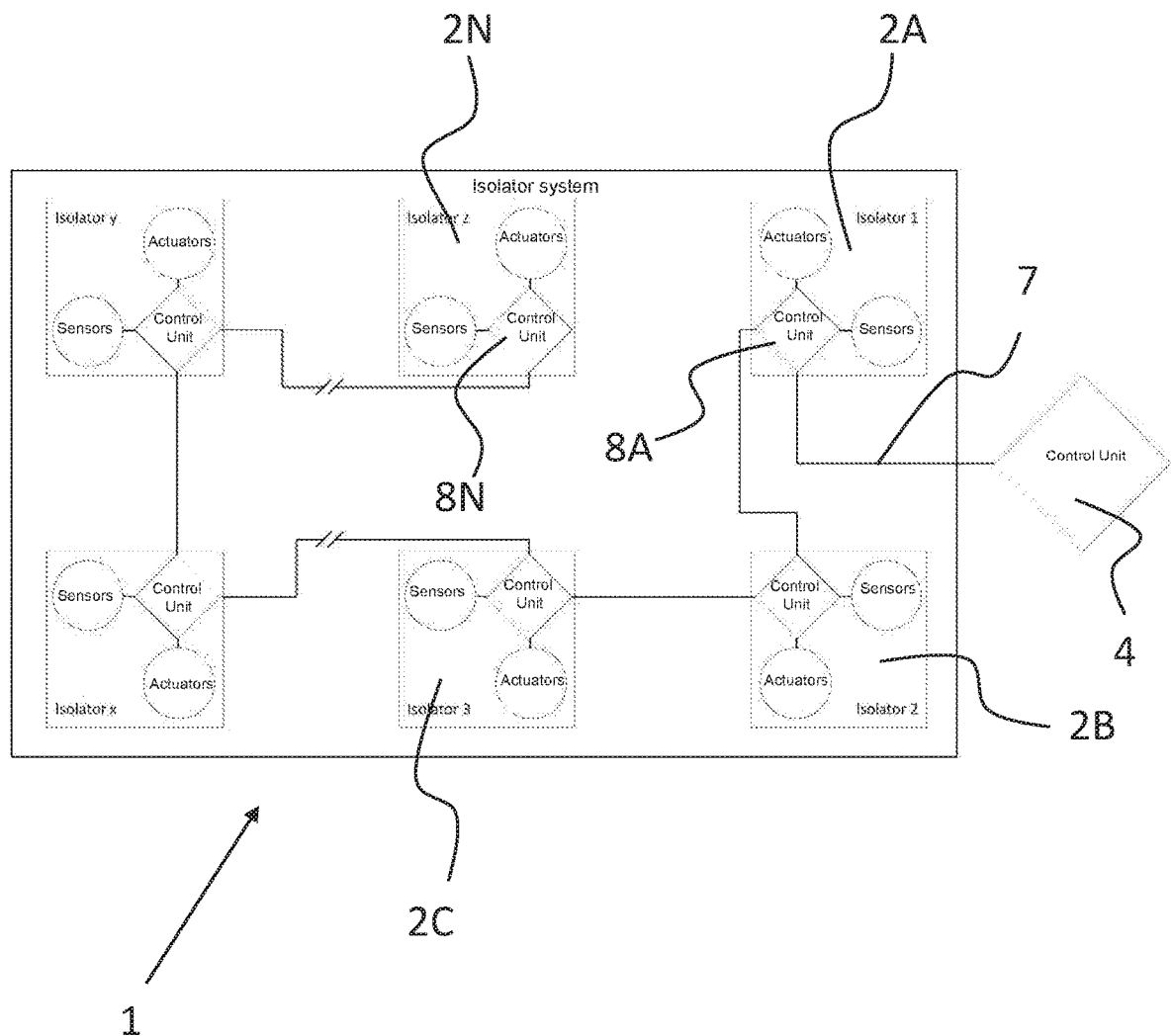
FIG. 4 illustrates the illustrates the simple scalability of the inventive vibration isolation systems.

As illustrated in FIG. 4 the invention provides simple scalability of vibration isolation system 1 in regard to the number of isolators 2A-2N. Isolators 2A-2N are connected in series to a bus system 7. No individual lines originating from central control unit 4 are required for each sensor and actuator. Other than that, the embodiment according to FIG. 4 is consistent with the embodiment according to FIG. 2.

It relates therefore to the embodiment of the invention in which an additional central control unit 4 is provided in spite of decentralized control units 8A-8N which are assigned to isolators 2A-2N.

However, because central control unit 4 is connected only to bus system 7, the control unit can be integrated into the active vibration isolation, irrespective of the number of isolators 2A-2N. The number of isolators 2A-2N is therefore limited possibly only by the maximum data transmission rate of bus system 7. Generally, this is high enough that it is not an issue in regard to the number of isolators 2A-2N that is useful in practice.

Figure 5:
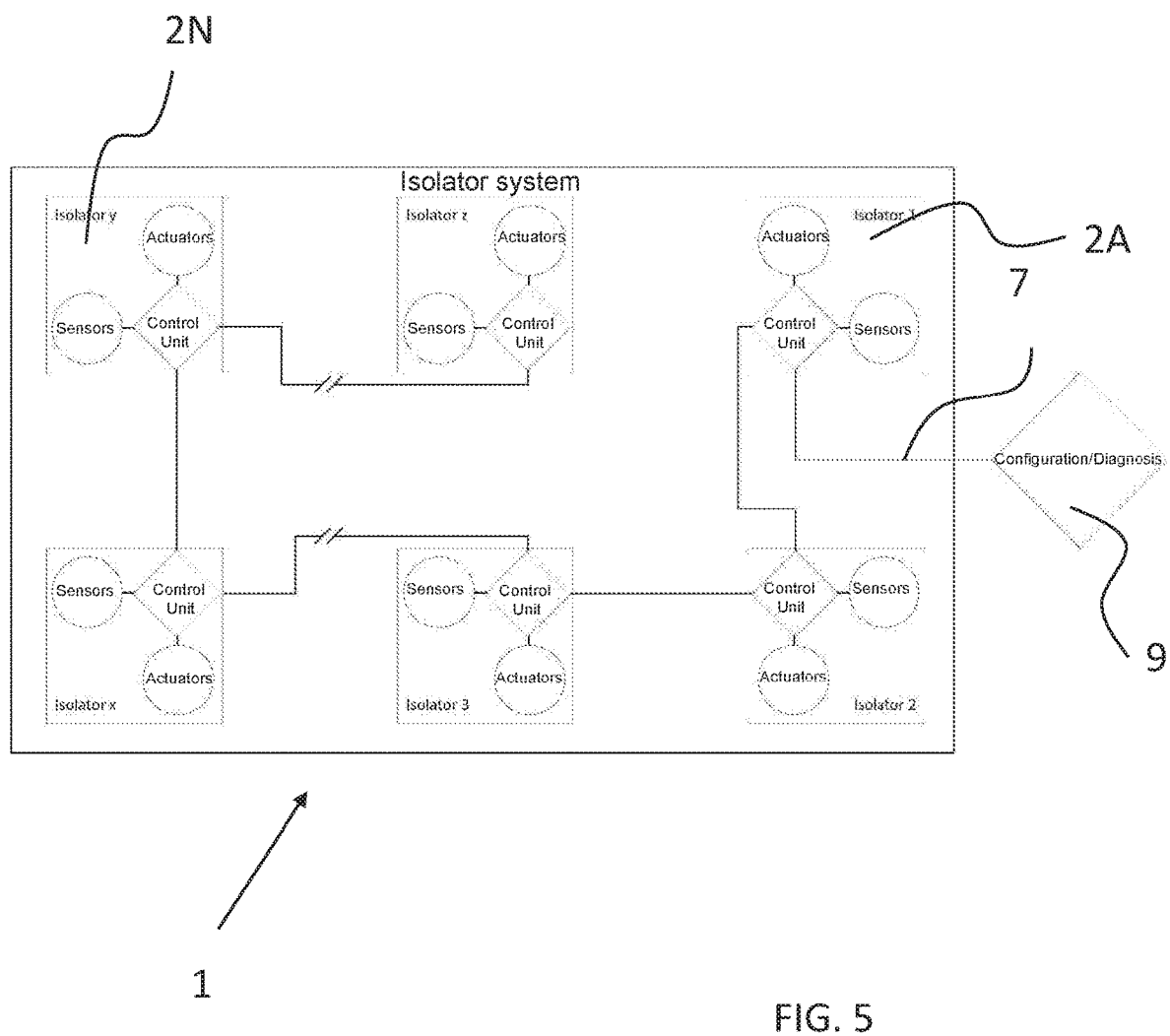
FIG. 5 also illustrates the simple scalability of the inventive vibration isolation systems in further detail.

As illustrated in FIG. 5 this applies also to a vibration isolation system 1, wherein isolators 2A-2N are not connected with a central control unit, but, as in this embodiment only, with a configuration/diagnostic unit 9.

Figure 6:
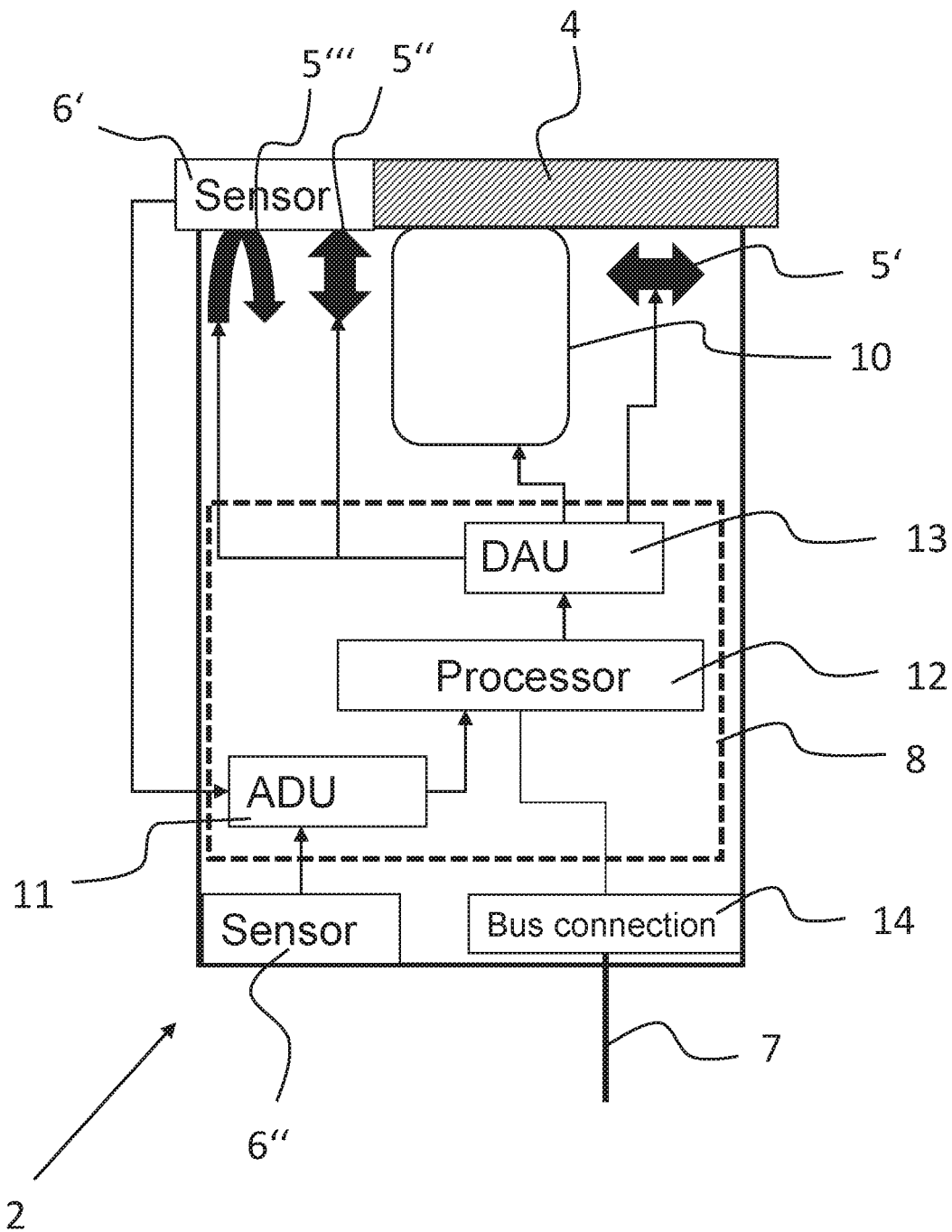
FIG. 6 is a schematic view of an isolator according to the invention.

FIG. 6 illustrates schematically the structure of an isolator 2, as can be used in particular for the vibration isolation system illustrated in FIG. 2 to FIG. 5. Isolator 2 includes a spring 10 which, which in this embodiment is in the form of a pneumatic spring.

The spring is effective in horizontal as well as in vertical direction and supports load 4 which is mounted in a vibration isolated manner on isolator 2.

Isolator 2 moreover includes actuators 5', 5''', and 5''''. In this schematic illustration, translational compensating forces are generated via actuators 5' and 5'' and rotational compensating forces are generated via actuator 5'''. Isolator 2 includes its own control unit 8 via which actuators 5' to 5'''' are controlled. The control unit 8 processes sensor signals.

In this embodiment at least one sensor 6' is provided which captures vibrations of load 4 which is mounted in a vibration isolated manner as well as an additional sensor 6'' which captures vibrations of the base, that is prolonging vibrations from the floor. The effective direction of sensors 6', 6'' is not illustrated in this schematic depiction. It is understood that different sensors are preferably used for different degrees of freedom, according to actuators 5' to 5'''' for different degrees of freedom.

On the basis of the signals of sensors 6' and 6'' the control unit controls actuators 5' to 5'''' in order to reduce vibration through generation of counter forces.

In concrete terms, control unit 8 includes an analog-digital converter 11, via which the analog sensor signal is converted into a digital signal which is transmitted to a processer 12 in the control unit where a program runs. It is understood that analog-digital converter 11 can be arranged at any desired location of isolator 2—for example in control unit 8 or also in sensor 6', 6'' itself.

Via processer 12, a digital control signal is generated which is transmitted to a digital-analog converter 13. Via digital-analog converter 13, actuators 5' to 5'''' which are preferably designed as solenoid actuators are controlled for active vibration isolation in that currents are produced from the digital control signals via which the solenoid actuator generates counter forces. It is understood that digital-analog converter 13 can also be arranged at any desired location of isolator 2.

In this embodiment, spring 10 is also integrated into the active vibration isolation.

Via a digital-analog converter 13 an analog control signal is also produced for a valve via which the pressure of spring 10 is regulated.

Isolator 2 includes bus connection 14 by way of which the isolator is connected to a bus system 7. Via bus system 7, isolator 2 or respectively control unit 8 can communicate with other isolators and/or with a central control unit and/or with a configuration and/or diagnostic unit. Apart from that, isolator 2 only requires a power source (not illustrated).

Figure 7:
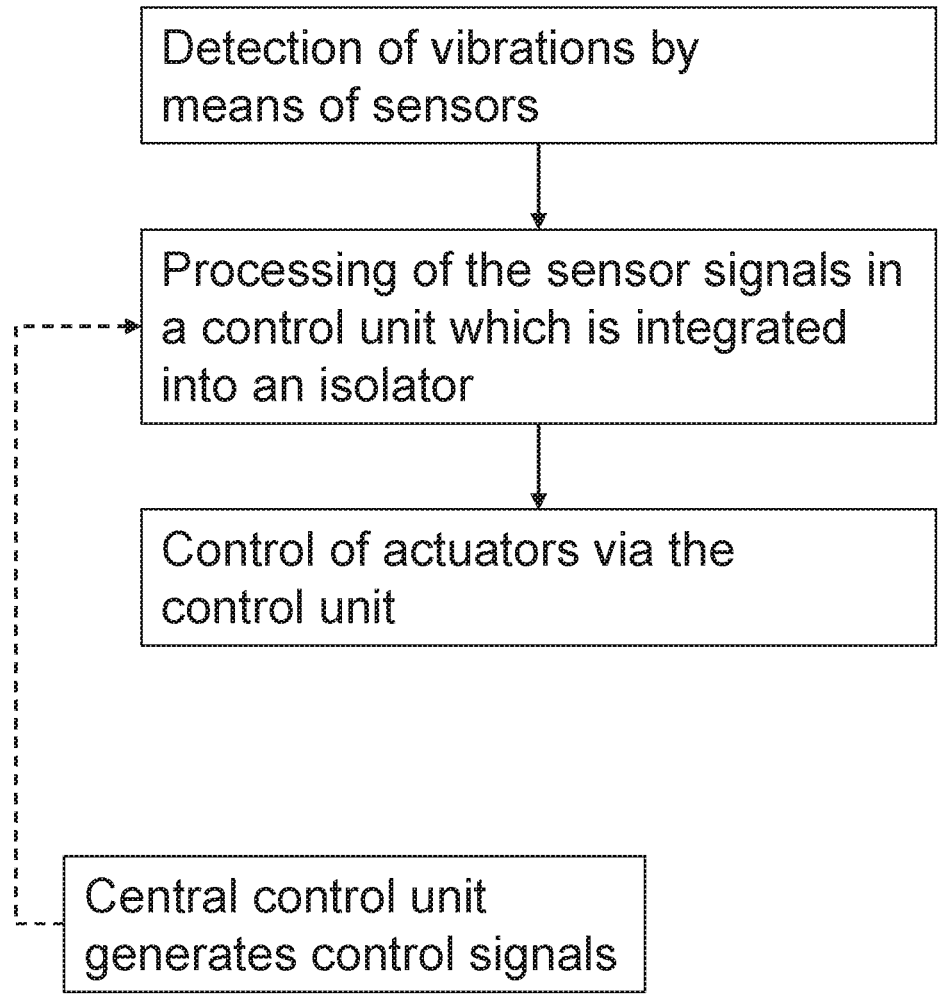
FIG. 7 is a flow chart of the process steps according to one embodiment of the invention.

FIG. 7 is a schematic flow chart of the basic principle of an exemplary method of the present invention.

Vibrations are captured by sensors. On the basis of the sensor signal which is processed in a control unit that is integrated into an isolator, the actuators of the isolators are controlled by the integrated control unit. As an option, control signals can be generated via a primary central control unit.

With the invention the installation costs of an active vibration isolation system could be reduced in a simple manner and at the same time, scalability in regard to the number of isolators could be increased.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LIST

1 vibration isolation system
2, 2A-2N isolator
3 central control unit
4 load, mounted in an isolated manner
5, 5A-5N actuator
6, 6A-6N sensor
7 bus system
8, 8A-8N control unit of an isolator
9 configuration/diagnostic unit
10 spring
11 analog-digital converter
12 processor
13 digital-analog converter
14 bus connection

What is claimed is:

1. A stationary vibration isolation system, comprising:
a plurality of isolators each including a base which is configured for being coupled with a floor, the plurality of isolators being configured for supporting a load which is mounted in a vibration isolated manner above the floor;
a plurality of actuators configured for actively countering vibrations of the load through a generation of counter forces, the plurality of actuators being integrated into the plurality of isolators;
a plurality of control units, an individual one of the plurality of control units being integrated respectively in each of the plurality of isolators, the individual one of the plurality of control units including a digital-analog converter coupled with the plurality of actuators of the respective one of the plurality of isolators;
a plurality of sensors coupled with each of the control units, the plurality of sensors being configured for sensing vibrations of the load; and
a bus system, the plurality of control units integrated respectively in the plurality of isolators being connected serially to the bus system.

2. The stationary vibration isolation system according to claim 1, wherein each of the control units further includes a respective processor, each of the processors being coupled with each of the digital-analog converters, each of the processors being configured for generating digital control signals and communicating the digital control signals to each of the digital-analog converters, each of the digital-analog converters being configured for converting the digital control signals into analog control signals for actuating the plurality of actuators.

3. The stationary vibration isolation system according to claim 1, further comprising a central control unit connected to each of the control units, the central control unit is configured for transmitting control signals to each of the control units.

4. The stationary vibration isolation system according to claim 1, wherein each of the control units is configured to actuate the actuators, independently of a central control unit.

5. The stationary vibration isolation system according to claim 1, wherein the bus system is a real time ethernet capable bus system.

6. The stationary vibration isolation system according to claim 5, wherein each of the control units includes an analog-digital converter configured for processing a sensor signal.

7. The stationary vibration isolation system according to claim 1, wherein the control units of the plurality of isolators are connected with one another via at least one of the bus system, a central control unit, a central configuration, and a diagnostic unit.

8. The stationary vibration isolation system according to claim 1, wherein the plurality of sensors is integrated into the plurality of isolators.

9. The stationary vibration isolation system according to claim 1, wherein compensating forces are generated in at least two degrees of freedom via the plurality of actuators.

10. The stationary vibration isolation system according to claim 9, wherein the compensating forces are generated in at least one of three translational degrees of freedom and three rotational degrees of freedom.

11. The stationary vibration isolation system according to claim 1, further comprising a machine mounted in a vibration isolated manner, the machine being configured for processing and measuring at least one of semiconductor components, nanostructured elements of laboratory equipment, and medical devices.

12. The stationary vibration isolation system according to claim 1, wherein a number of isolators of the plurality of isolators is not limited by a central control unit.

13. The stationary vibration isolation system according to claim 1, wherein each of the isolators includes a respective pneumatic spring coupled with the respective control unit, wherein each of the control units is configured for actively controlling each of the pneumatic springs.

* * * * *